United States Patent
Mattox

(10) Patent No.: US 8,255,957 B1
(45) Date of Patent: Aug. 28, 2012

(54) METHOD AND APPARATUS FOR SYNCHRONIZING LOCAL AND REMOTE AUDIO AND VIDEO PROGRAM SOURCES

(75) Inventor: Jeffrey Mattox, Middleton, WI (US)

(73) Assignee: The Buddy System, LLC, Middleton, WI (US)

( * ) Notice: Subject to any disclaimer, the term of this patent is extended or adjusted under 35 U.S.C. 154(b) by 1153 days.

(21) Appl. No.: 12/114,353

(22) Filed: May 2, 2008

Related U.S. Application Data

(60) Provisional application No. 60/915,559, filed on May 2, 2007.

(51) Int. Cl.
*H04N 7/20* (2006.01)

(52) U.S. Cl. .................. 725/63; 725/64; 725/67; 725/68

(58) Field of Classification Search .................... 725/36, 725/63, 64, 65, 66, 67, 68; 455/3.01, 3.02, 455/3.05, 3.06; 348/14.02, 512, 513, 514, 348/515, 516, 517, 518
See application file for complete search history.

(56) References Cited

U.S. PATENT DOCUMENTS

| | | | | |
|---|---|---|---|---|
| 3,835,253 A | * | 9/1974 | Bond | 348/518 |
| 5,515,110 A | * | 5/1996 | Alig et al. | 348/594 |
| 5,543,743 A | * | 8/1996 | Cooper | 327/263 |
| 6,005,633 A | * | 12/1999 | Kosugi | 348/518 |
| 6,601,237 B1 | * | 7/2003 | Ten Kate et al. | 725/47 |
| 2003/0214605 A1 | * | 11/2003 | Snyder et al. | 348/578 |

* cited by examiner

*Primary Examiner* — John Schnurr

(74) *Attorney, Agent, or Firm* — Craig A. Fieschko, Esq.; Dewitt Ross & Stevens, S.C.

(57) ABSTRACT

A method and apparatus for eliminating the apparent delays in a televised presentation between local program content and delayed program content received from a remote location, e.g., via satellite. Local and remote program signals are delayed by the system and method and then combined to provide an output program signal where there is no apparent delay between the content from the different program sources. The delay of the input signals is preferably automatically adjusted such that the start of the program output is not delayed and may be obtained by imperceptibly altering the input program content, e.g., using delay buffers.

16 Claims, 10 Drawing Sheets

PRIOR ART

Single hop using a synchronous satellite

PRIOR ART

Terrestrial Relay

Multiple hops using
low-Earth orbit satellites

Satellite Relay

Multiple hops using
low-Earth orbit satellites
(E.g., Iridium network)

RTD  2.0  seconds (assumes 1.0 second in both directions)
Cycles  4

Initial Delay L = 2.0 * 4 = 8
Initial Delay S = 8 - 2 = 6

| Time (Sec) | Local Program (Buffer L in) | As heard at remote location (Intercom) | As spoken at remote location | Satellite feed (Buffer S in) | FIRST EMBODIMENT Delay L | Buffer L out | Delay S | Buffer S out | Output (no gaps) | Conventional result (has gaps) |
|---|---|---|---|---|---|---|---|---|---|---|
| 0 | Our first | | | | 8 | | 6 | | | Our first |
| 1 | report is | Our first | | | 8 | | 6 | | | report is |
| 2 | from | report is | | | 8 | | 6 | | | from |
| 3 | Germany | from | | | 8 | | 6 | | | Germany |
| 4 | | Germany | | | 8 | | 6 | | | |
| 5 | | | RICHARD, | | 8 | | 6 | | | |
| 6 | | | EVERYTHING | RICHARD, | 8 | | 6 | | | RICHARD, |
| 7 | | | IS OKAY. -- | EVERYTHING | 8 | | 6 | | | EVERYTHING |
| 8 | | | | IS OKAY. -- | 8 | Our first | 6 | | Our first | IS OKAY. -- |
| 9 | That's | | | | 8 | report is | 6 | | report is | That's |
| 10 | good news | That's | | | 8 | from | 6 | | from | good news |
| 11 | thank you. | good news | | | 8 | Germany | 6 | | Germany | thank you. |
| 12 | (pause) | thank you. | | | 6 | | 6 | RICHARD, | RICHARD, | (pause) |
| 13 | Our next | (pause) | | | 6 | | 6 | EVERYTHING | EVERYTHING | Our next |
| 14 | report from | Our next | | | 6 | | 6 | IS OKAY. -- | IS OKAY. -- | report from |
| 15 | Japan: | report from | | | 6 | That's | 4 | | That's | Japan: |
| 16 | | Japan: | | | 6 | good news | 4 | | good news | |
| 17 | | | JAPAN IS | | 6 | thank you. | 4 | | thank you. | |
| 18 | | | IN GOOD | JAPAN IS | 6 | (pause) | 4 | | (pause) | JAPAN IS |
| 19 | | | SHAPE | IN GOOD | 6 | Our next | 4 | | Our next | IN GOOD |
| 20 | | | TODAY.-- | SHAPE | 6 | report from | 4 | | report from | SHAPE |
| 21 | | | | TODAY.-- | 6 | Japan: | 4 | | Japan: | TODAY.-- |
| 22 | And now | | | | 4 | | 4 | JAPAN IS | JAPAN IS | And now |
| 23 | we switch to | And now | | | 4 | | 4 | IN GOOD | IN GOOD | we switch to |
| 24 | London for | we switch to | | | 4 | | 4 | SHAPE | SHAPE | London for |
| 25 | the details: | London for | | | 4 | | 4 | TODAY.-- | TODAY.-- | the details: |
| 26 | | the details: | | | 4 | And now | 2 | | And now | |
| 27 | | | THIS IS | | 4 | we switch to | 2 | | we switch to | |
| 28 | | | LONDON | THIS IS | 4 | London for | 2 | | London for | THIS IS |
| 29 | | | TALKING. | LONDON | 4 | the details: | 2 | | the details: | LONDON |
| 30 | | | THE WAR IS | TALKING. | 2 | | 2 | THIS IS | THIS IS | TALKING. |
| 31 | | | OVER. -- | THE WAR IS | 2 | | 2 | LONDON | LONDON | THE WAR IS |
| 32 | | | | OVER. -- | 2 | | 2 | TALKING. | TALKING. | OVER. -- |
| 33 | (pause) | | | | 2 | | 2 | THE WAR IS | THE WAR IS | (pause) |
| 34 | Our final | (pause) | | | 2 | | 2 | OVER. -- | OVER. -- | Our final |
| 35 | report is | Our final | | | 2 | (pause) | 0 | | (pause) | report is |
| 36 | from France: | report is | | | 2 | Our final | 0 | | Our final | from France: |
| 37 | | from France: | | | 2 | report is | 0 | | report is | |
| 38 | | | IT WAS A | | 2 | from France: | 0 | | from France: | |
| 39 | | | CALM DAY | IT WAS A | 0 | | 0 | IT WAS A | IT WAS A | IT WAS A |
| 40 | | | IN FRANCE | CALM DAY | 0 | | 0 | CALM DAY | CALM DAY | CALM DAY |
| 41 | | | TODAY | IN FRANCE | 0 | | 0 | IN FRANCE | IN FRANCE | IN FRANCE |
| 42 | | | | TODAY | 0 | | 0 | TODAY | TODAY | TODAY |
| 43 | Goodnight | | | | 0 | Goodnight | 0 | | Goodnight | Goodnight |

Fig. 6

RTD   2.0   seconds (assumes 1.0 second in both directions)
Cycles   4

| Time (sec) | Local Program (Buffer L in) | As heard at remote location (Intercom) | As spoken at remote location | Satellite feed | SECOND EMBODIMENT ||| Conventional result (has gaps) |
|---|---|---|---|---|---|---|---|---|
| | | | | | Delay L | Buffer L out | Output (no gaps) | |
| 0 | Our first | | | | 0.0 | And now | And now | Our first |
| 1 | report is | Our first | | | 0.4 | here's a | here's a | report is |
| 2 | from | report is | | | 0.8 | report | report | from |
| 3 | Germany | from | | | 1.2 | from | from | Germany |
| 4 | | Germany | | | 1.6 | | | |
| 5 | | | RICHARD, | | 2.0 | Germany -- | Germany -- | |
| 6 | | | EVERYTHING | RICHARD, | 0.0 | | RICHARD, | RICHARD, |
| 7 | | | IS OKAY. -- | EVERYTHING | 0.0 | | EVERYTHING | EVERYTHING |
| 8 | | | | IS OKAY. -- | 0.0 | | IS OKAY. -- | IS OKAY. -- |
| 9 | That's | | | | 0.0 | That's good | That's good | That's |
| 10 | good news | That's | | | 0.3 | to hear, | to hear, | good news |
| 11 | thank you. | good news | | | 0.6 | thank | thank | thank you. |
| 12 | (pause) | thank you. | | | 0.9 | you. | you. | (pause) |
| 13 | Our next | (pause) | | | 1.2 | (pause) | (pause) | Our next |
| 14 | report from | Our next | | | 1.5 | Our next | Our next | report from |
| 15 | Japan: | report from | | | 1.8 | report is | report is | Japan: |
| 16 | | Japan: | | | 2.0 | | | |
| 17 | | | JAPAN IS | | 2.0 | from Japan: | from Japan: | |
| 18 | | | IN GOOD | JAPAN IS | 0.0 | | JAPAN IS | JAPAN IS |
| 19 | | | SHAPE | IN GOOD | 0.0 | | IN GOOD | IN GOOD |
| 20 | | | TODAY.-- | SHAPE | 0.0 | | SHAPE | SHAPE |
| 21 | | | | TODAY.-- | 0.0 | | TODAY.-- | TODAY.-- |
| 22 | And now | | | | 0.0 | | | And now |
| 23 | we switch to | And now | | | 0.5 | And now we | And now we | we switch to |
| 24 | London for | we switch to | | | 1.0 | switch to | switch to | London for |
| 25 | the details: | London for | | | 1.5 | London for | London for | the details: |
| 26 | | the details: | | | 2.0 | the details: | the details: | |
| 27 | | | THIS IS | | 2.0 | | | |
| 28 | | | LONDON | THIS IS | 0.0 | | THIS IS | THIS IS |
| 29 | | | TALKING. | LONDON | 0.0 | | LONDON | LONDON |
| 30 | | | THE WAR IS | TALKING. | 0.0 | | TALKING. | TALKING. |
| 31 | | | OVER. -- | THE WAR IS | 0.0 | | THE WAR IS | THE WAR IS |
| 32 | | | | OVER. -- | 0.0 | | OVER. -- | OVER. -- |
| 33 | (pause) | | | | 0.0 | (pause) | (pause) | (pause) |
| 34 | Our final | (pause) | | | 0.5 | Our final | Our final | Our final |
| 35 | report is | Our final | | | 1.0 | report is | report is | report is |
| 36 | from France: | report is | | | 1.5 | from | from | from France: |
| 37 | | from France: | | | 2.0 | France: | France: | |
| 38 | | | IT WAS A | | 2.0 | | | |
| 39 | | | CALM DAY | IT WAS A | 0.0 | | IT WAS A | IT WAS A |
| 40 | | | IN FRANCE | CALM DAY | 0.0 | | CALM DAY | CALM DAY |
| 41 | | | TODAY | IN FRANCE | 0.0 | | IN FRANCE | IN FRANCE |
| 42 | | | | TODAY | 0.0 | | TODAY | TODAY |
| 43 | Goodnight | | | | 0.0 | Goodnight | Goodnight | Goodnight |

METHOD AND APPARATUS FOR SYNCHRONIZING LOCAL AND REMOTE AUDIO AND VIDEO PROGRAM SOURCES

This application claims the benefit of U.S. Provisional Application No. 60/915,559, filed May 2, 2007, which is incorporated herein by reference in its entirety.

FIELD OF THE INVENTION

The present invention pertains generally to satellite communications and to live televised presentations incorporating program elements transmitted via satellite communications and, more particularly, to a system and method for eliminating the apparent delay between televised program elements originating from a local source and those received from a remote location via satellite communications.

BACKGROUND OF THE INVENTION

In broadcast and cable television newscasts and other programs, there are often times when a program segment originates at a remote location and is communicated via satellite. As illustrated in FIGS. 1-3, satellite delays occur because communication signals 30 must go from the transmitting ground station 32 to the satellite 34 and then return to the receiving ground station 36. If the satellite 34 is in a synchronous orbit (22,236 miles above the Earth's surface), as shown in FIG. 1, the distance up and back is at least is 44,472 miles. The time for a transmitted signal 30 to reach a synchronous satellite 34 plus the time for the response to be received back on the ground is from 0.24 to 0.28 seconds, depending on the locations of the transmitter 32 and receiver 36. The propagation delay will be less for satellites 34 in low-Earth orbits, such as the Iridium constellation (485 miles above the surface). However, in many of these cases, as illustrated in FIGS. 2 and 3, it may require two or more satellite hops for the signal 30 to get from the remote location to the local studio.

Communication delays of the type described are most evident for satellite links, but terrestrial links can cause delays too. In addition to propagation delays purely due to distance, the communication signal likely undergoes one or more digital conversions, compressions/decompressions, encryptions/decryptions, and error corrections, all of which can introduce additional delays of 0.05 seconds or more per hop.

Although the travel times for signals to go in both directions between a local studio and a remote site might be the same, this is not necessarily the case, as the travel times depend on the communication circuits used for the two paths. An intercom function from the local studio to the remote site is often called an "IFB" (interrupted feedback). Typically, this intercom path is audio-only and relatively low quality because it is used only by a reporter at the remote site to hear the cues or questions spoken by the anchorperson at the local studio (it might even be a one-way circuit). In contrast, the signal from the remote site contains video and is usually carried by a high-quality circuit. For example, the intercom from the local studio might be carried over a terrestrial telephone circuit, while the remote program is sent via a satellite link. It is not uncommon, however, for the remote signal to be carried by satellite telephone, in which case the remote program audio and video quality is mediocre, but the single telephone circuit can perform both intercom and program duties.

Because of the distance the signal must travel from the remote location to the broadcasting studio (perhaps using multiple satellite hops) and because the signal likely undergoes digital processing en route, it could take nearly a second for remote program content to reach the local studio. Furthermore, if the reporter at the remote location is responding to a live cue from the local anchorperson, the perceived delay at the studio could be doubled since a full round trip is required. This total round-trip delay (RTD) is the delay perceived by a viewer, and is a combination of the time it takes for the anchorperson's cue to reach the remote location plus the time it takes for the reporter's response to reach the local studio. After the anchorperson introduces the remote reporter, there will be no apparent reply until the reporter hears his cue over the intercom, begins to speak, and his remote program is received back at the local studio. From the viewer's perspective, this delay manifests as an awkward (and often annoying) two- to three-second pause between the time the anchorperson finishes his introduction or question and when the remote reporter begins his response.

If a remote program segment can be recorded in advance of being put on the air, then the delays can be edited out of the recorded program. However, this technique is not always practical, especially for a program such as a newscast that needs to have a "live" quality.

What is desired, therefore, is a system and method for eliminating in real time the perceived delay between local and remote program elements of a live televised presentation.

SUMMARY OF THE INVENTION

The present invention provides a system and method that accepts audio and video signals representing program segments from a first or local source (e.g., an anchorperson in a television studio) and another pair of signals representing related program segments from a second or remote source, but which are time delayed relative to the local source (e.g., a reporter at a remote location whose signals are being communicated via long terrestrial and/or satellite links), and that synchronizes and combines the signals in real time in a manner that conceals the delays. In accordance with the present invention, this is accomplished by inserting artificial compensating delays in the signal paths and by adjusting these delays as the production ensues. The present invention thus permits the local anchorperson to appear to interact with the reporter at the remote location in near real time (e.g., to deliver cues to the reporter or to ask questions). The present invention may manage several sequential remote segments (each having possibly different delays) in the same program. The present invention is applicable to any "live" production that involves the interaction of program sources at multiple locations, such as television broadcasting and cablecasting.

The objects and advantages of the invention will appear more fully from the following detailed description of the preferred embodiments of the invention made in conjunction with the accompanying drawings.

BRIEF DESCRIPTION OF THE DRAWINGS

FIG. 6 is timeline chart demonstrating a method in accordance with the first embodiment of the present invention for a short program containing four cycles.

FIG. 9 is timeline chart demonstrating a method in accordance with the second embodiment of the present invention for a short program containing four cycles.

DETAILED DESCRIPTION OF THE INVENTION

Figure 1:
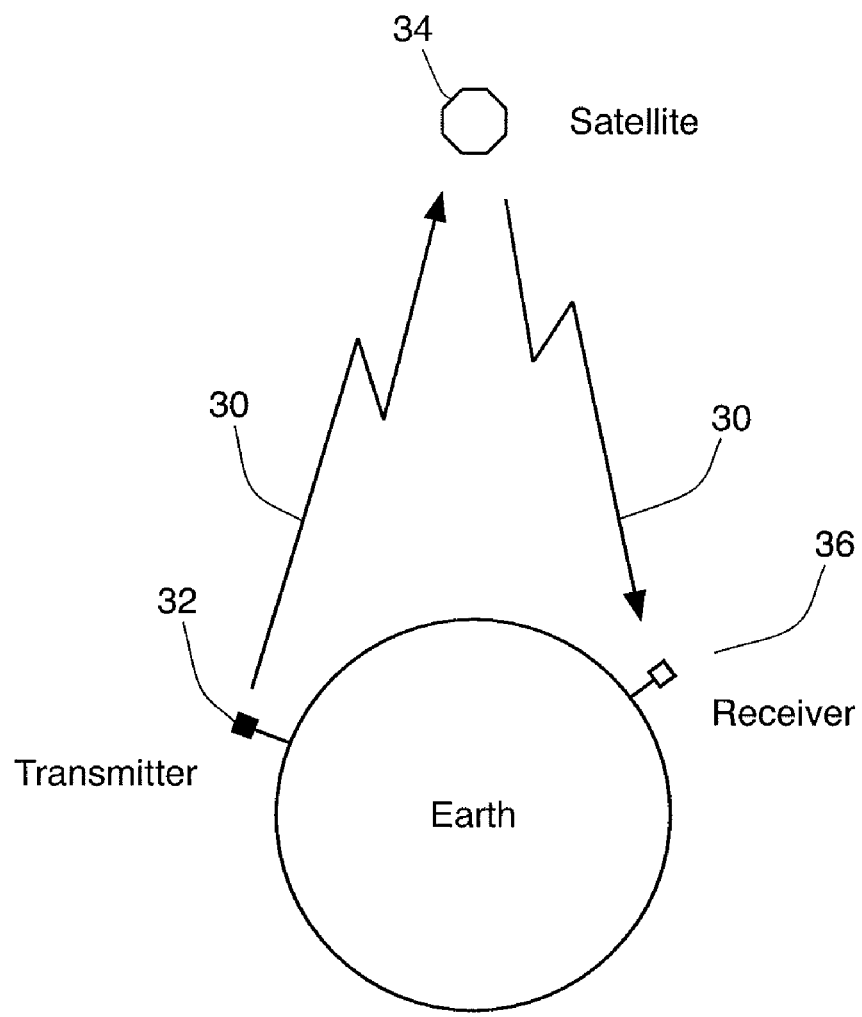
FIG. 1 is a schematic illustration of satellite communications using a satellite in Earth synchronous orbit.
Figure 2:
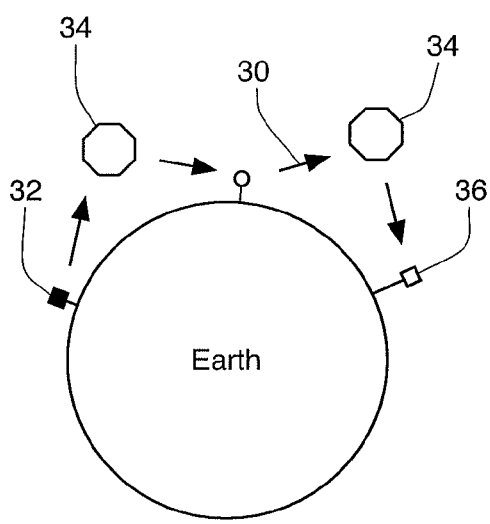
FIG. 2 is a schematic illustration of satellite communications using multiple satellites in low-Earth orbit and a terrestrial relay.
Figure 3:
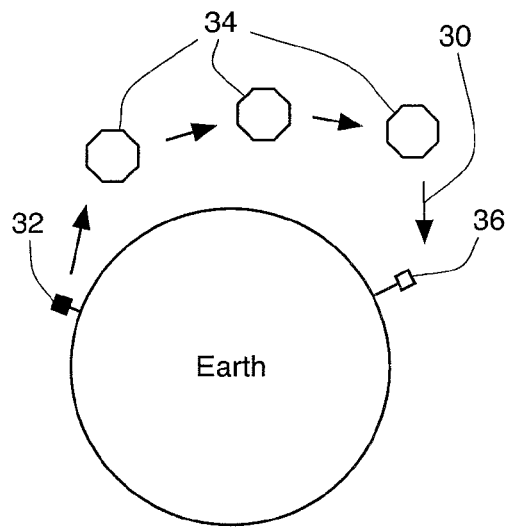
FIG. 3 is a schematic illustration of satellite communications using multiple satellites in low-Earth orbit.

The present invention will now be described in detail by describing in sequence several embodiments of the invention, from a very simple embodiment to a full preferred embodiment of the invention. The descriptions of the preliminary embodiments of the invention provided herein lay a foundation for better understanding the final preferred embodiment described. This detailed description is presented with reference to exemplary application of the present invention to dealing with communications delays resulting from communications via satellite links. It should be understood, however, that a system and method in accordance with the present invention is not limited to such applications, and may be applied to deal effectively with communications via any other known or future communication methods where communication delays may be a concern.

As described above, the basic problem that is solved by the present invention involves a program containing live audio and video program segments (also referred to herein as program elements) originating from at least two different sources, a first (or local) program source and a second (or remote) program source, with a communications delay between the program segments from the two sources. The program segments from the two sources are to be presented in alternating fashion in a combined program. The present invention allows such a combined program to be generated in real time such that the communications delay between the program sources is invisible to viewers of the program.

In the following description, the term "program segments" (or "program elements") refers to desirable program content from the local and remote program sources that is to appear in the output combined program (e.g., audio and video of a local anchorperson asking a question and audio and video of a remote reporter responding to the question). In the context of a live program, communications delays between the local and remote program sources manifest as a delay in the receipt of the remote program segments (i.e., desirable content from the remote program source) following the end of a preceding local program segment. In other words, between the end of a local program segment and the start of a subsequent remote program segment the signal carrying program segments from the remote program source provides initially audio and video that does not contain desirable program content (e.g., audio and video of the remote reporter inactive) followed by the desirable program content which represents the actual remote program segment.

The objective of the present invention is to eliminate in real time the delay between the program segments received from the remote and local program sources so that there is no apparent delay between the desirable program content of the alternating local and remote program segments provided in the program output. In a broad sense this is achieved by removing in real time the undesirable program content at the beginning of each remote program segment, which is the result of the communications delay, from the combined program output such that the resulting output program includes alternating local and remote program segments containing only desirable program content with no apparent delay between them.

A most basic way to achieve this objective in accordance with the present invention is initially to delay the program output by a few seconds from the start of the first local program segment and have an operator manually skip the undesirable output content at the start of every remote program segment by manually reducing the delay at the exact moment that the undesirable content appears at the output. In this manner the delay between local and remote program segments is manually excised from the remote program signal, with the initial program segments moved forward in time to fill the time representing the undesirable content removed from the remote program signal. This manual solution is probably impractical, however, because it would require that a control room operator be assigned the task of monitoring the program at the delay output. It also precludes the use of transition effects such as split-screens where the local anchorperson and remote reporter appear together on the screen, and it would prevent "live" interaction between the anchorperson and the reporter.

Figure 4:
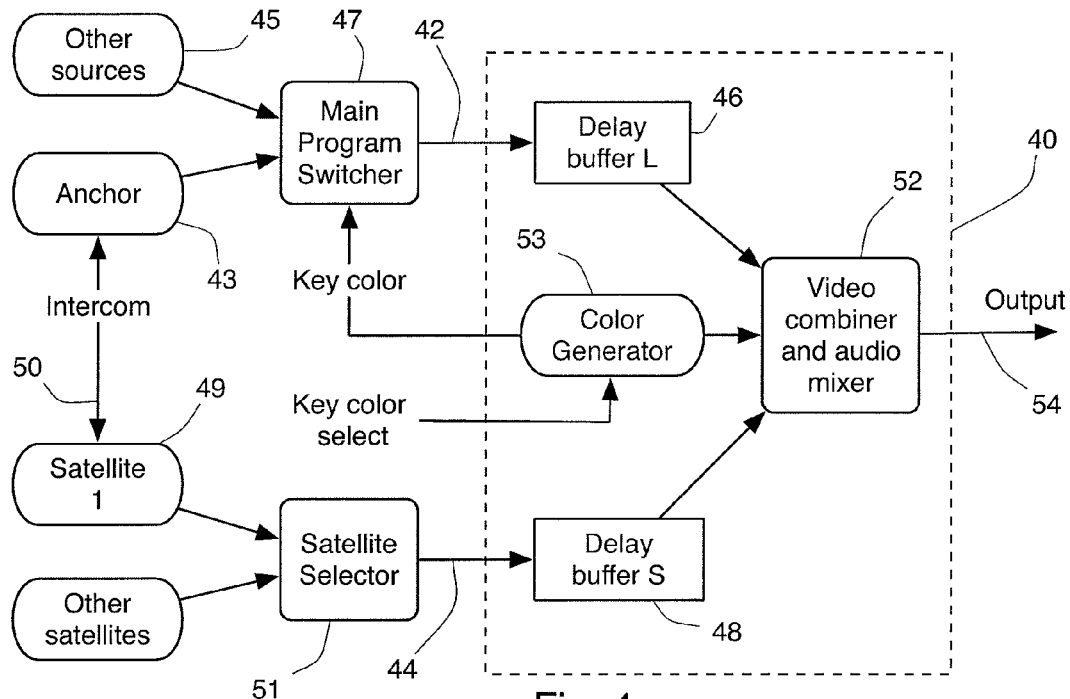
FIG. 4 is a simplified block diagram of an exemplary system in accordance with the present invention.

As illustrated in FIG. 4, in a first embodiment of a system 40 in accordance with the present invention, input signals are received along two input signal paths, one 42 for the local programming (the "local program") and the other 44 for the remote feed (the "remote program"). The local programming 42 may include, for example, a live anchorperson 43 and/or local program segment content from other 45 sources, such as pre-recorded content. Switching between local program segment content provided by the available local sources 43 and 45 to provide the local programming signal 42 may be provided in a conventional manner by a main program switcher 47.

The remote program signal 44 may be received from one or more remote locations, e.g., via one or more satellites 49. A conventional satellite selector 51 may be used to select the satellite or other source from which the remote program signal 44 is to be provided.

An intercom connection 50 provides communications between the local program location and the remote program location, e.g., between the anchorperson 43 and a reporter at the remote location. As discussed elsewhere herein, the intercom connection 50 may be implemented via satellite communications or in another manner as desired, e.g., using a terrestrial or satellite telephone connection.

For each signal path 42, 44 the system 40 in accordance with the present invention provides logic that implements an adjustable internal delay. This delay logic may be implemented, for example, using delay buffers L 46 and S 48, for the local 42 and remote 44 program paths, respectively. The delay buffers 46 and 48 preferably may be implemented in any manner such as to delay the received signals by a delay value that may be set to values of from a fraction of a second to several seconds with a resolution preferably of at least 0.1 second. (It should be noted that each input signal path 42 and 44 typically may be adapted to receive input signals that contain both audio and a video components that are processed by separate audio and video circuitry as appropriate. For purposes of the present invention as described, however, the two components are treated as a unit. Specifically, the video and audio components in each signal path 42 and 44 are delayed internally in the system 40 by the same amount.)

In accordance with the present invention, the local program 42 is delayed internally by the system 40 for a slightly longer time than the remote program 44. The amount of this extra delay is based upon and preferably equal to, or approximately equal to, the total round-trip delay time (RTD) for the intercom signal 50 to travel from the local studio to the remote location (e.g., for sending a cue) plus the time for the remote program signal to travel back to the studio.

The system 40 in accordance with the present invention includes video and audio switching logic 52 that selects or mixes the internally delayed input signals and directs the result to the output 54. When the output 54 selection is switched from the delayed local program 42 to the delayed remote program 44, this is called a "handover." When the output 54 selection is switched back from the remote program 44 to the local program 42, this is called a "handback." Together, a handover and a handback constitute one "cycle." (The logic that controls when to perform a handover or handback is described in further detail below, as are the functions of the color generator 53 and video combiner.)

In the simplest case, where there is to be a single report from a remote location (one cycle), it is only necessary initially to delay the local program 42 by RTD seconds until the handover, at which time the remote program 44 is selected directly (with no internal delay). When the remote program 44 ends, a handback is executed by selecting the local program 42 (without an internal delay). In other words, in this case the initial conditions would be Delay L equal to RTD, and Delay S equal to zero. As a result, there would be no perceived delay in the output 54 at either the handover or handback. After the cycle is complete, both delays (L and S) would be zero.

In a more complicated case, where multiple cycles are anticipated, the initial internal delays must be longer. The initial local program delay L must be at least as long as the sum of all RTD seconds for all handovers. The initial delay S for the remote program would be that total minus the RTD for the first handover. That is, Delay L would be equal to RTD times the number of cycles, and Delay S would be set to RTD times one less than the number of cycles (which is the same as Delay L minus RTD).

For example, if the RTD for an unprocessed handover is two seconds and there are five such handovers planned in the program, then Delay L would be 10 seconds and Delay S would be 8 seconds. Delay L could be longer than 10 seconds, in which case Delay S would be longer too, and would be set to Delay L minus RTD.

In the multiple-cycle case, after each handover, Delay L is reduced by RTD. After each handback, Delay S is set to the current Delay L value minus RTD (minimum value zero). At that point, one cycle has been completed, both delay values have been reduced by RTD, and the system 40 is ready to handle another cycle. This process continues for all of the cycles or until Delay L reaches zero (in which case no more cycles can be handled).

Continuing the above example, Delay L will be zero after all five cycles have been completed. Delay S will also be zero, and the system 40 will not be able to perform additional cycles without resetting both delays (which would interrupt the output 54).

Figure 5:
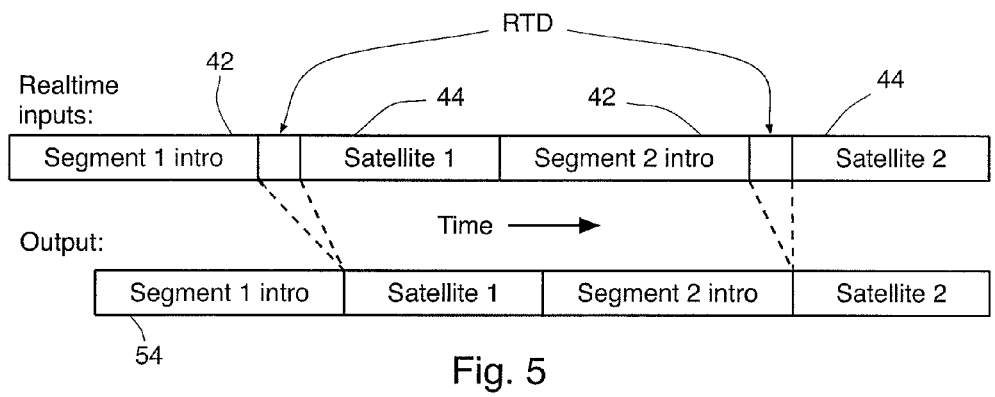
FIG. 5 is a timeline graph showing the timing relationship between real time local and remote input signals and the resulting output signals as provided by a first embodiment of a system in accordance with the present invention.

A timeline graph showing the timing relationship between real time local 42 and remote 44 input signals and the resulting output 54 signal for two exemplary cycles, as provided by this embodiment of a system 40 in accordance with the present invention, is presented in FIG. 5. A timeline chart demonstrating a method in accordance with the first embodiment of the present invention as just described for a short program containing four cycles is presented in FIG. 6. This illustration shows the exemplary values of the delays L and S during each cycle of the program, with the seven boxed values indicating when the two delays change at handovers and handbacks.

The logic for a method in accordance with the first embodiment of the invention as just described may be summarized as follows:

RTD=Round trip delay
RTDn=Round trip delay (one value per remote source)
RTDc=Round trip delay of the currently selected source
Initial conditions:
    Delay L=sum of all RTDn values in the broadcast
    Delay S=Delay L−RTDc
Handover: When both video and audio have been switched to S (remote program):
    Set Delay L=Delay S
    Delete the oldest content in buffer L, as necessary.
Handback: When both have been switched back to L (local program)
    Set Delay S=Delay L−RTDc (but never negative)
    Delete the oldest content in buffer S, as necessary.
When another remote source (e.g., satellite) is selected:
    Set Delay S (target)=Delay L−RTDc (but never negative)
    To decrease Delay S, simply stop adding new content to buffer S until the delay matches the target value.
    To increase Delay S, add the necessary amount of new "black" content as the newest content (black video and silence).

A few limitations of the first embodiment of the present invention as just described must be noted. Since the local program must be delayed initially, in time-critical situations (such as a newscast) it would be necessary to start producing the local program earlier than the scheduled time to cause the local program to appear on the output at the proper clock time. For example, the local program might have to be started ten seconds before the scheduled broadcast start time. Also, since the number of cycles and the RTD values will vary from one telecast the next, it could be difficult to plan each telecast. The earlier start time and the longer production time may be confusing when creating the program.

Figure 7:
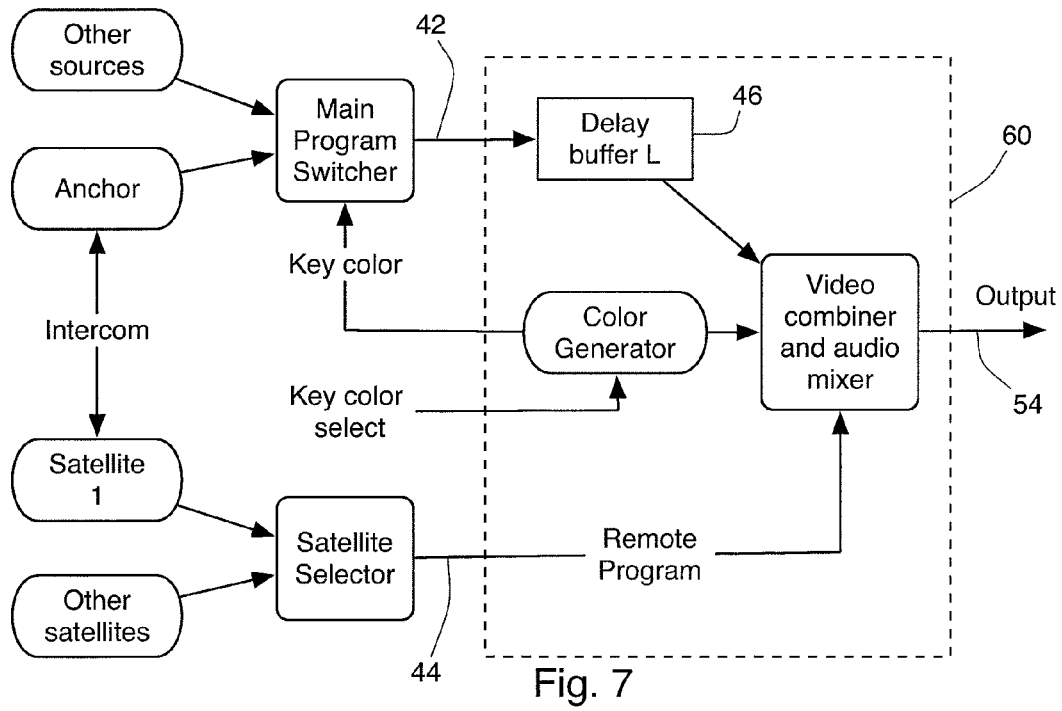
FIG. 7 is a simplified block diagram of an exemplary system in accordance with a second embodiment of the present invention.

A second embodiment of the present invention which allows production to start at the program's scheduled time (no delay) will now be described. In this embodiment 60 of the present invention, as illustrated in FIG. 7, there is no Delay S of the remote signal. Delay of the local signal Delay L starts off at zero, but is slowly increased to RTD during local program segments, and is set to zero during remote program segments.

Various techniques may be used to increase the delay L during local program segments. One simple scheme is to duplicate buffer L input video frames at a rate too slow to be perceived. For example, with a video rate of approximately 30 frames per second, one frame out of every 30 may be added twice to the buffer (or simply marked to be output twice, this requires less processing time, because duplicate information does not need to be stored), thus adding approximately 1/30-th of a second of content to the buffer and 1/30-th of a second to Delay L. The local program audio is delayed in a similar fashion by adding 1/30-th of a second of silence or appropriate audio at nearly the same point in the program. When adding one frame per second, it would take about 30 seconds of real time to add one second of content to the delay and the local program buffer. Another method to increase the delay is to not advance the output pointer when retrieving the current output sample (this will cause the output sample to be used twice). Other schemes could add partial frames and at irregular intervals based on image and audio processing algorithms, e.g, based on the mathematical properties of the content. Any appropriate method may be used to increase the Delay L. However, it is important that, whichever method is used, the additional video and audio content used to achieve the delay is not perceptible by a viewer.

When Delay L has been increased to reach RTD, the system 60 is ready to perform one handover/handback cycle. If no more cycles are anticipated, then the incrementing process is stopped and the local program will end at the scheduled time.

If multiple cycles are needed in a short period (e.g., within 30 seconds), then Delay L may be increased at a higher rate (e.g., by duplicating more than one frame per second). If Delay L has not reached RTD by the time a handover is to occur, some residual, but tolerable, delay of the remote signal 44 may appear at the output 54.

In effect, a method in accordance with this second embodiment of the present invention spreads out the remote signal delays over longer periods of time (specifically, during the local content prior to the handover) so they are not perceived.

Figure 8:
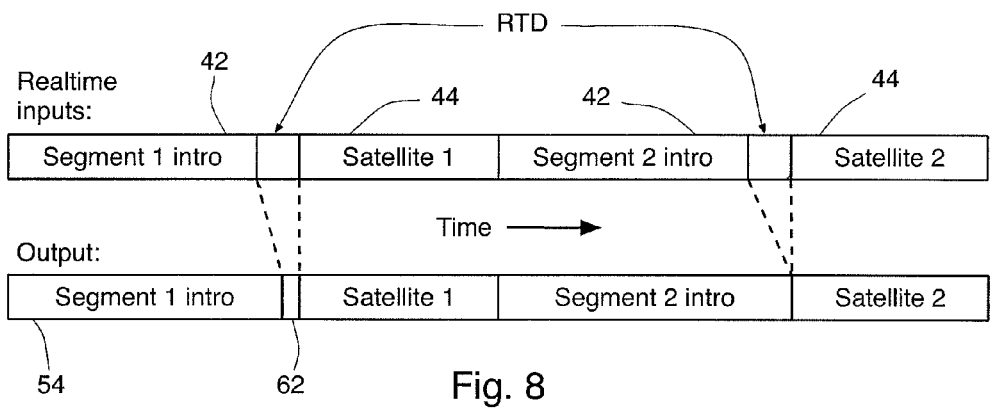
FIG. 8 is a timeline graph showing an exemplary timing relationship between real time local and remote input signals and the resulting output signal as provided by a second embodiment of a system and method in accordance with the present invention.

A timeline graph showing an exemplary timing relationship between real time local 42 and remote 44 input signals and the resulting output 54 signal for two exemplary cycles, as provided by this second embodiment of a system 60 in accordance with the present invention, is presented in FIG. 8. Note the residual delay 62 in the output signal 54 resulting from Delay L not reaching RTD by the time the first handover occurs in this example. This delay has disappeared by the time of the second handover.

A timeline chart demonstrating a method in accordance with the second embodiment of the present invention as just described for a short program containing four cycles is presented in FIG. 9. This illustration shows the exemplary value of the delay L which increases gradually to the RTD each cycle. The four boxed values indicate when the delay L value is reset to zero at each handover.

A preferred embodiment of the present invention will now be described. This embodiment of the present invention combines concepts from the embodiments described previously to permit program production in real-time and allow frequent handovers. The system block diagram for a system 70 in accordance with this preferred embodiment of the present invention is presented in FIG. 11. In this figure the local 42 and remote 44 input signals and the output signal 54 are shown as comprising separate video (42v, 44v, and 54v) and audio (42a, 44a, and 54a) component channels.

In accordance with this preferred embodiment of the present invention both the local 42 and remote 44 input signals may be delayed before being combined 52 and presented at the output 54. In this version of the present invention both the local delay L and the remote delay S start off at zero (at the beginning of the first cycle). Thus, production of the program may begin at the scheduled air time. The local Delay L is increased gradually, in the manner described above. However, instead of stopping at RTD, both Delay L and Delay S continue to be increased to values that are adequate for all of the anticipated cycles in the program. The delays preferably may be increased during both local and remote segments, as necessary. If any handover/handback cycles occur before the delays have reached their final values, the target delays are simply reduced by RTD each time. The operation with respect to handovers and handbacks is the same as described above with respect to the first embodiment described.

For simplicity, the system 70 in accordance with this embodiment of the present invention may be designed to have a constant cycle target of, say, two cycles. After each cycle, the delays are built back up to allow for yet two more cycles. Near the end of the production (anytime after the last handover has been performed), an "End Production" signal may be provided (e.g., by the program director or any other user pressing a button). In response to the End Production signal the system 70 preferably gradually (rapidly but imperceptibly) depletes the remaining delays to zero, thus allowing the production to end at the scheduled time. Depletion of the delays can be accomplished, for example, by skipping video frames and time-compressing the audio. Duplicate frames anywhere in the delay buffer, if any, could be removed first.

This preferred embodiment of the present invention allows the production to begin and end at the scheduled times, and it supports multiple, closely-spaced cycles. (As mentioned above, cycles early in the program might still suffer some apparent residual delay.) As with the second embodiment described above, this embodiment of the present invention spreads out the delays, but over all of the previous content (local and remote).

Figure 10:
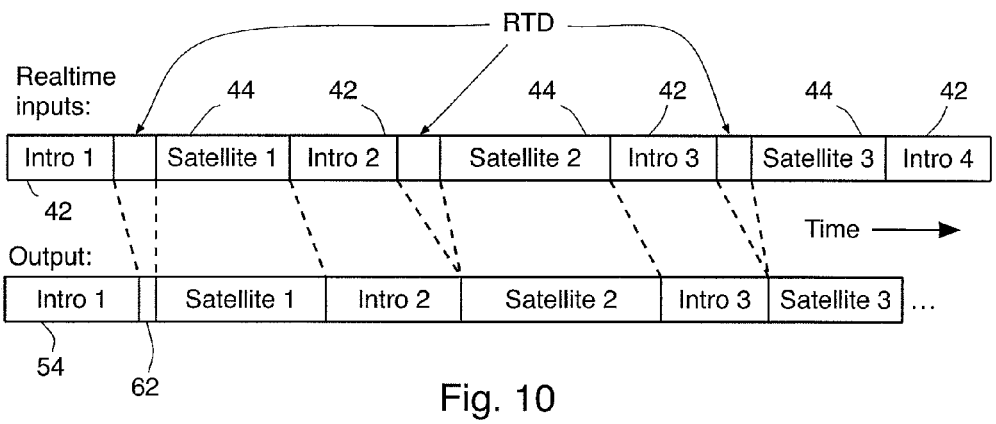
FIG. 10 is a timeline graph showing an exemplary timing relationship between real time local and remote input signals and the resulting output signal for several exemplary cycles, as provided by a preferred embodiment of a system and method in accordance with the present invention.

A timeline graph showing an exemplary timing relationship between real time local 42 and remote 44 input signals and the resulting output 54 signal for several exemplary cycles, as provided by this preferred embodiment of a system 70 in accordance with the present invention, is presented in FIG. 10. Note the residual delay 62 in the output signal 54 resulting from Delay L not reaching RTD by the time the first handover occurs in this example. This delay has disappeared by the time of the second handover.

The logic for a method in accordance with the preferred embodiment of the invention as just described may be summarized as follows:
 RTD=Round trip delay
 RTDn=Round trip delay (one value per remote source)
 RTDc=Round trip delay of the currently selected source
 Initial conditions:
  Delay L=0
  Delay S=0
 During local content:
  Increase (increment) Delay L by one frame out of many frames (e.g., 1 out of 30).

Limit: sum of all RTDn values remaining in the broadcast Increase (increment) Delay S by one frame out of many frames (e.g., 1 out of 30)

Limit: Delay L−RTDc (but never negative)

Handover: When both video and audio have been switched to S (remote program):
Set Delay L=Delay S
Delete the oldest content in buffer L, as necessary.

Handback: When both have been switched back to L (local program)
Set Delay S=Delay L−RTDc (but never negative)
Delete the oldest content in buffer S, as necessary.

When another remote source (e.g., satellite) is selected:
Set Delay S (target)=Delay L−RTDc (but never negative)
To decrease Delay S (decrement), simply stop adding new content to buffer S until the delay matches the target value.
To increase Delay S (increment), add the necessary amount of new black content as the newest content.

To skip a cycle, gradually reduce both delays (e.g., by skipping video frames and time-compressing the corresponding audio). One means would be to drop a frame when two similar frames are detected.

Figure 11:
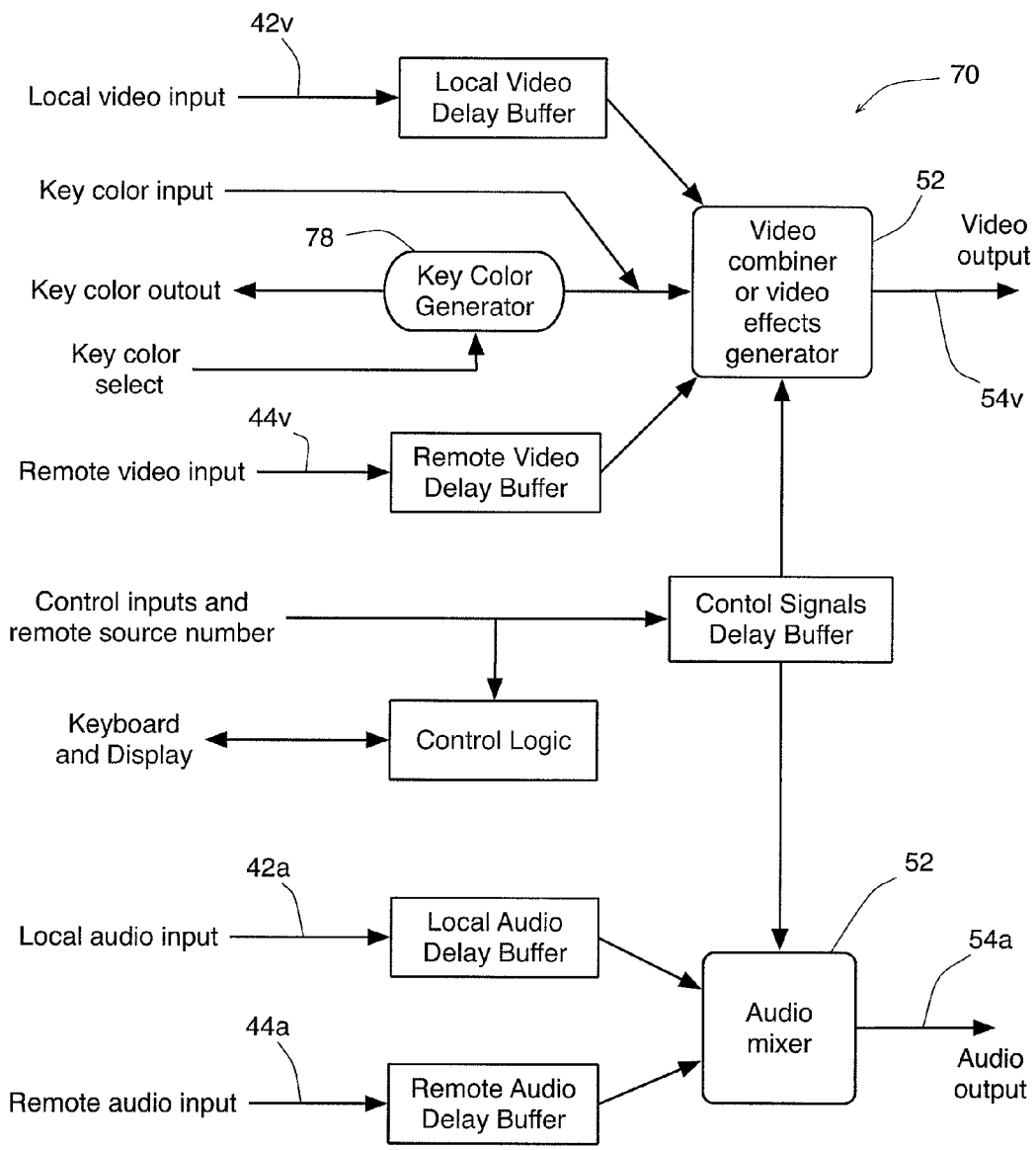
FIG. 11 is a more detailed functional block diagram of an exemplary preferred embodiment of system in accordance with the present invention.

A block diagram showing in more detail the functional aspects of an exemplary preferred system 70 in accordance with the present invention is presented in FIG. 11. A system 70 in accordance with the present invention may be implemented using standard computer components and only a few specialized hardware components. For example, the video, audio, and control signal delays can be implemented using digital samples stored on a computer disk drive, and many of the settings and preferences can be input using a standard computer keyboard or other input device. Some customized inputs and output circuits might be needed for connecting to standard television studio production equipment and to provide switches and buttons for operator inputs. Some applications might only require video (or audio) synchronization, in which case the audio (or video) related components of the system 70 as illustrated are not needed.

Figure 12:
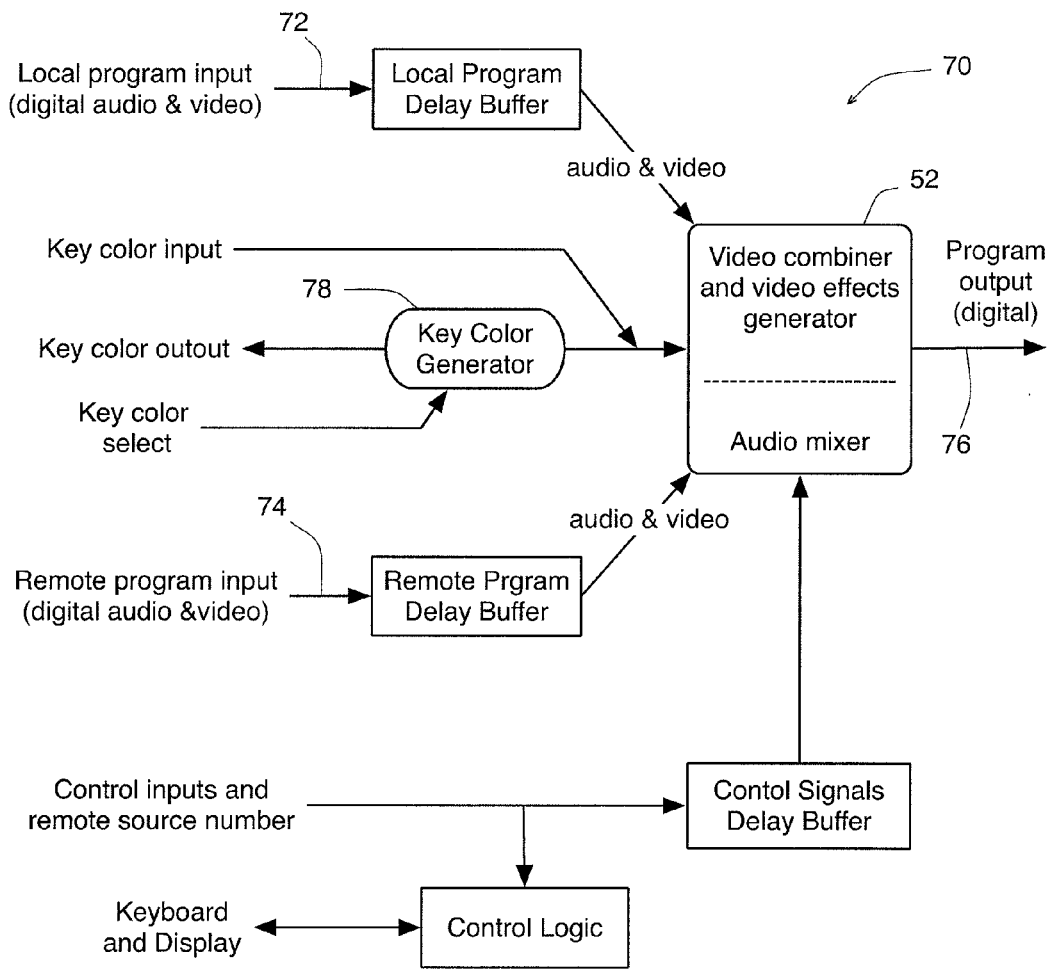
FIG. 12 is a more detailed functional block diagram of an alternative implementation of an exemplary preferred embodiment of a system in accordance with the present invention.

An alternative implementation of a preferred system 70 in accordance with the present invention is shown in detail in the block diagram of FIG. 12. In this implementation, two pairs of audio and video inputs arrive as combined digital signals 72 and 74, as would be the case when using the industry standard serial digital interface (SDI) with embedded audio. Likewise, the output 76 is a combined audio and video signal. In this implementation fewer blocks are required, since one delay can delay both audio and video. The two components (audio and video) are separated at the output of the delays and processed separately by the logic in block 52 in the manner described herein.

It is also possible to insert the control information into the local serial data stream and use the local delay buffer for the control delay. Such issues are implementation details.

Additional details concerning handover and handback program switching logic for a system and method in accordance with the present invention will now be described. In accordance with the present invention, an operator who is monitoring the outputs of the two delays could manage manual handovers and handbacks in real time, but this technique would be impractical and error prone. An automatic control scheme is preferred. A video combiner 52 mixes the output of the video delays. An example is described below.

A simple automatic technique would be to use an internal "chroma keyer." Chroma keyers are commonly used in the television industry to replace one video source (e.g., a weathercaster standing in front of a blue screen) with another source (e.g., a weather map) based on a color (e.g., blue) appearing in one of the input signals or in a separate video input (a key channel). Use of a chroma keyer permits split-screen and other effects that show both program sources (local and remote) together on the same screen. The device could include an optional color generator 78 that may be set to one of numerous colors according to the needs of the producer. The color chosen should be one that differs from all other solid color areas in the local signal. A specific video pattern (e.g., a checkerboard or alternating lines of color) can be used instead of or in conjunction with the key color to make the area recognition logic more robust. This color signal is also connected as an input to the broadcast studio switcher to be used as a substitute for the remote feed. Wherever and whenever the remote feed is to appear in the output (whether full or split screen), this key color is used instead as a placeholder. The internal chroma keyer replaces that color with the remote video from delay buffer S. (To reduce accidental triggers, the color must appear as a region of solid color larger in area than some preset size.) The device could also resize and position the remote video, as necessary, to match the color geometry of the key color (e.g., in case of a split-screen with a reduced image size). The delay values are changed whenever the color appears full screen after a handover (Delay L is reduced) or none of that color appears after a handback (Delay S is reduced).

If split screen effects are used, after each handover the remote source would normally be full screen at least briefly before the following handback (so that Delay L can be changed) and, after each handback, the local source would normally be full screen at least briefly before the next handover (so that Delay S can be changed). Otherwise, one of the video sources will appear to jump when the associated delay is changed.

Another automatic technique is to monitor the tally light circuit corresponding to the remote feed. (Tally lights indicate which video sources are "on the air" and are typically red lights located on the cameras, devices, and monitors associated with each video source. The tally lights work automatically as the operator selects different video sources on the master switcher.) The tally signals are delayed (by amount L) and used to switch between the local and remote signals.

The video combiner 52 could be implemented as a digital video effects (DVE) generator. This would allow effects other than chroma keying to be used as transitions between the local and remote inputs, such as dissolves or wipes. The desired transition mode could be input to the device and delayed along with the local program signals before being processed by the DVE.

The local anchorperson and the remote reporter can appear together in split-screen mode, and the anchor can ask an opening question to the reporter prior to the handover to which the reporter can respond. At the output, the response will be seen without the remote delay. The anchorperson and reporter can appear in split-screen mode during the handback, too, but the anchorperson cannot ask a question of the reporter while staying in split screen mode without there being a sudden "jump" in the video. The jump would occur because both delay values must be reduced (by RTD) before the remote response. To implement this case (two handovers without an intervening handback), a "Cycle Now" signal may be generated (e.g., by actuating a button) when the anchor completes his question. That action would reduce both delays, thus initiating a new cycle. (The execution of the new cycle would be delayed by amount L.)

A better split-screen handover could be accomplished by switching to the remote program full-screen following the question and treating that transition as a handback and an immediate handover (this could be automatic), thus decrementing both delays by RTD. Although the remote program video would jump, it would be obscured by the change to full-screen mode. Alternatively, a fast video dissolve of the remote program (as being output from buffer S) could obscure the skip of the remote program.

During a "B-roll", the remote program video (but not audio) is temporarily replaced by a local video source. This is performed by using the B-roll source as the remote program input (temporarily replacing the actual remote video) or by selecting the remote program on the local switcher (performing an automatic handback) and inserting the B-roll content using the local program switcher (thereafter, the remote feed can be treated as a local source).

The internal audio switcher uses the delayed local program audio if any of the local program video is visible at the output. The delayed remote program audio is used if any of the remote program video is visible at the output. If both program sources are visible, then the two audio sources are mixed together.

An "audio-under" handover ("L-cut") is where the local audio continues under the remote video prior to a handover. Because the remote video will not be visible at the output, this scheme requires using a delayed control signal to manage the mixing and switching functions.

The present invention may also be applied to prevent apparent delays if one remote reporter (remote #1) needs to do a handover to another remote reporter (remote #2) as part of a program presentation. In this case, the remote #1 content may be switched as the local program input, as if it was the local program. This will execute a handback, but it will be unnoticed at the output. Then the second remote source (remote #2) is selected as the remote program input. The RTD value for this remote input preferably should be based on the apparent RTD between the two remote inputs, but from the perspective of the local studio. (This value may be easiest to determine empirically by trying various RTD values prior to the actual production.) The first reporter can now perform a normal handover to the second reporter. This technique is also useful when the anchorperson is hosting the broadcast from a location that is remote relative to the studio switcher.

Since there is a delay between the actual program inputs and the switching (or mixing) of those inputs, the signals that control the switching or mixing must also be delayed. The examplary technique described earlier uses a key color in the local program signal to control the internal switching logic. This "in-band" signaling does not require additional delay circuits, but it could cause an error due to the program content (e.g., if local program itself contained an area of that key color). A more robust technique is to use "out-of-band" signaling, whereby the control signals (e.g., tally signals and transition mode) are stored in a separate delay (of length L), and the output of that delay is used to control the internal switcher. This technique also allows more flexibility in transitions (e.g., dissolves and wipes), separate audio and video control, and easier implementation of future system improvements.

The control information could be added to local video signal, but placed in the vertical blanking interval. While still sharing the same delay path as the video signal, this would be an out-of-band signal. The process of adding and detecting this information might make such a scheme overly complicated.

Command and control of the system in accordance with the present invention may also be done via a network port, such as Ethernet.

In the case where a system in accordance with the present invention will be used for programs that receive remote content from multiple remote sources, the RTD values for several remote sources can be preprogrammed in advance, and the proper value used depending on the particular source that is selected. The RTD could be manually changed or chosen from a preset list of RTDs based on tally information from the external selector.

Figure 13:
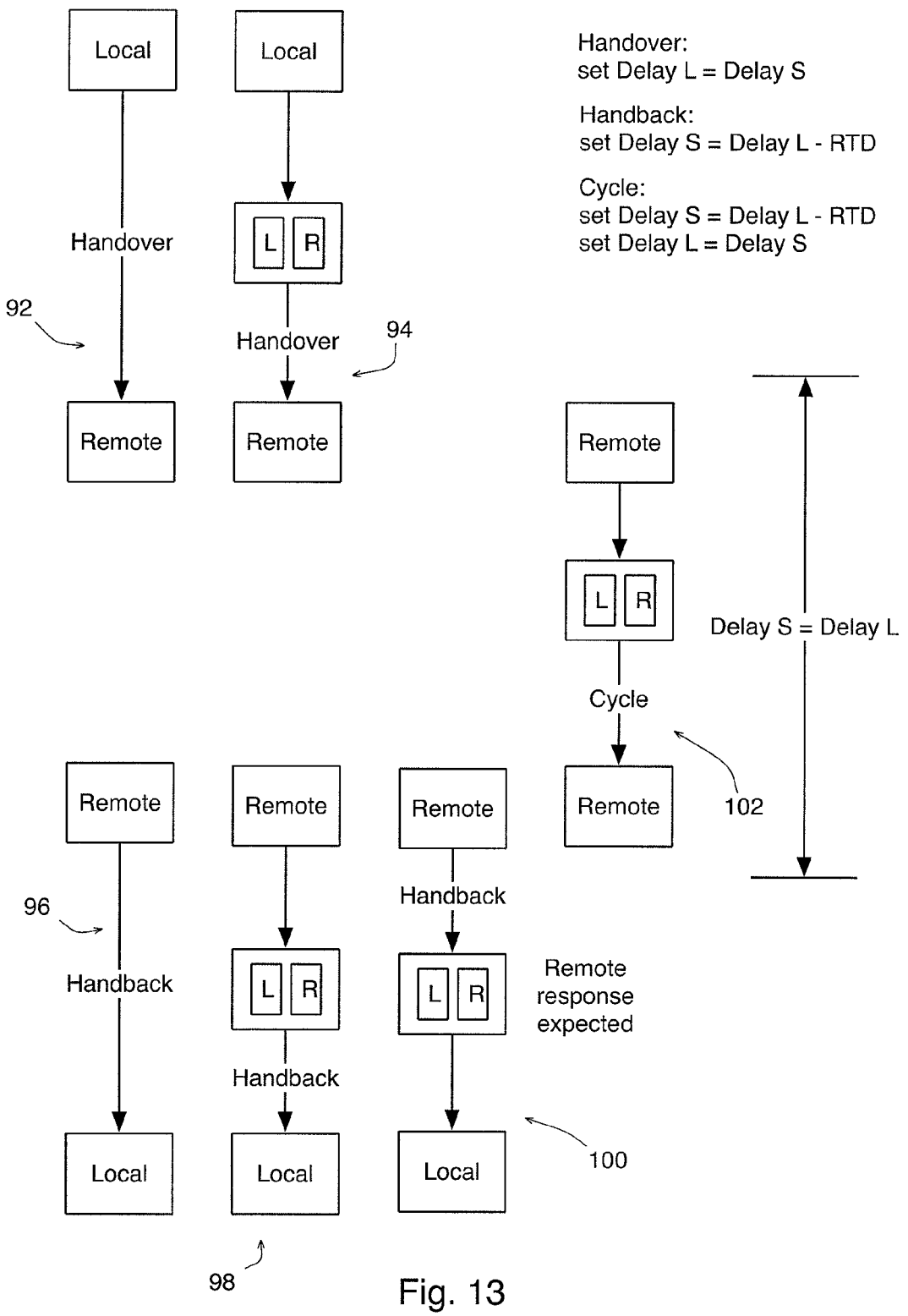
FIG. 13 is a schematic illustration of various simple handover/handback variations between local and remote program sources that would produce clean transitions using a system and method in accordance with the present invention.

Various simple handover/handback variations between local and remote program sources that would produce clean transitions are illustrated schematically in FIG. 13. In a few cases there would be a discontinuity in program content (e.g., a handback prior to a split-screen or a cycle at any point would produce a jump in the remote program), but it would be masked by a change in the screen layout. The variations illustrated include: basic, full-screen (cut) handover to remote 92, basic, split-screen handover to remote 94, basic, full-screen (cut) handback from remote 96, basic, split-screen handback from remote 98, split-screen handback, followed by a return to the remote (e.g., for a "thank you") 100, and temporary split-screen, followed by a full-screen remote (e.g., answer to a question) 102.

Figure 14:
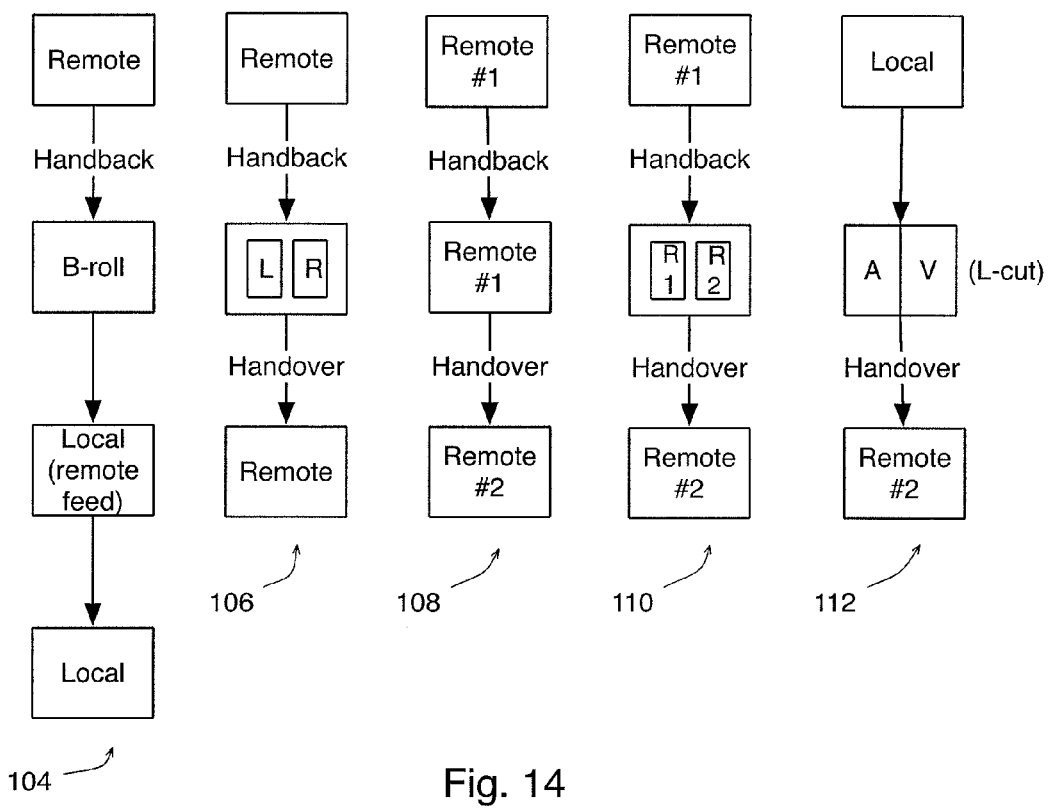
FIG. 14 is a schematic illustration of various more complicated handover/handback variations between local and remote program sources that would produce clean transitions using a system and method in accordance with the present invention.

Some relatively complicated handover/handback variations between program sources are illustrated schematically in FIG. 14. The variations illustrated include: handling a B-roll on the local switcher 104; performing an intermediate split-screen question/answer with the remote reporter 106, similar to variation 102 in FIG. 13; the reporter at one remote site can perform a full-screen handover to a reporter at another remote site 108; the reporter at one remote site can perform a split-screen handover to a reporter at another remote site 110; and "Audio-under" handover (video from remote appears during local audio) 112. Many other variations are possible and could be contemplated but are not detailed here.

If the current RTD value is unknown, the actual RTD value can be determined empirically by having the operator depress an "Auto RTD" button at the end of the cue (handover) and then release the button when the remote content starts. The system can then determine the current RTD (after making appropriate allowances for human reaction times) and set the value of Delay S accordingly (by adding to or removing from the newest content in buffer S).

The audio and video portions of remote program feeds are often transmitted over different paths, resulting in annoying "lip-sync" problems. Lip-sync correction could be accomplished by setting slightly different values for the delays of the remote audio and video signals.

In order to perform clean transitions between two video sources, the video sources must be synchronized, or "genlocked" (generator lock). This is also a requirement for the chroma key function. In modern television studios, especially those using digital video signals, all program sources are normally genlocked by default. However, to accommodate situations where the external video signals are not synchronized, the device could incorporate a genlock circuit to synchronize the remote video with the local video.

It is not uncommon for a remote reporter to monitor the live telecast to receive his cues. In accordance with the present invention, however, the live telecast is artificially delayed. The remote reporter must use the intercom channel 50 (e.g., IFB) to receive audio cues (in real time) directly from the studio. Since cellular phones and even satellite phones are ambiguous, such a "reverse channel" is easily implemented.

A summary of various additional or alternative technical details is presented below:

Inputs (not meant to be inclusive)
    Local program (audio and video)
    Remote program (audio and video)
    Key color (optional, video from an external generator)
    (Analog inputs are converted to digital values for processing, delaying, etc.)
    Current remote source (e.g., satellite) number
    Manual handover, handback, and master switcher tally signals (in lieu of using chroma keyer)
    "Auto RTD" button (for automatic determination of RTD)
    "End Production" button (indicates that no more cycles are anticipated, whereby the system depletes the delays)
    Ethernet port (diagnostics and control)
    USB port (disk expansion)
    Power Outputs (not meant to be inclusive)
    Program output (audio and video)
    Key color (video)
    (Analog outputs are converted from digital values.)

Settings and Commands (not meant to be inclusive)
    Key color selection
    RTD values for each remote source
    Anticipated number of cycles
    Add/delete cycles (increment/decrement)
    Split-screen settings (e.g., remote program position offset and scale)

Display (not meant to be inclusive)
    Status information, such as:
    Number of cycles ready to go
    Delay L value
    Current RTD Processing threads/tasks
(This list is not meant to be inclusive of all threads and tasks, but the major ones are shown.)

High priority (must occur deterministically, 30 times/second, to maintain proper output):
    Acquire and store local audio and video input samples in L buffers
        Add (e.g., duplicate) input samples when appropriate to increase delay
    Acquire and store remote audio and video input samples in S buffers
        Add (e.g., duplicate) input samples when appropriate to increase delay
    Retrieve video samples at delay L & S outputs, mix as appropriate, send to output
    Advance output pointers
    Retrieve audio samples at delay L & S outputs, advance output pointers, determine handover/handoff state, mix as appropriate, send to video output Medium priority:
    Compute desired Delay L value, determine increment/decrement state
        Adjust L buffers content and I/O pointers if necessary (for step changes)
    Compute desired Delay S value, determine increment/decrement state
        Adjust S buffers content and I/O pointers if necessary (for step changes)

Low priority (approximately 10 times per second):
    Sample switch and button inputs, process as appropriate
    Process keyboard
    Prepare values for display, output to display It is understood that the invention is not confined to the particular construction and arrangement of parts herein illustrated and described, but embraces such modified forms thereof as come within the scope of the following claims.

What is claimed is:

1. A method for presenting alternating program content segments from a first source and from a second source, where the program content segments from the second source are each delayed from corresponding program content segments from the first source by a round-trip delay (RTD), comprising:
    a. receiving and saving the program content segments from the first source;
    b. receiving and saving the program content segments from the second source;
    c. in real time combining alternating program content segments from the first and second program sources to provide a sequence of program segments without any apparent delay therebetween, wherein the steps of combining the alternating program content segments in real time and providing the sequence of program segments as an output includes the steps of:
        (1) setting a first program source delay time and a second program source delay time at zero;
        (2) increasing the duration of program content segments;
        (3) gradually increasing the first program source delay time by an amount corresponding to the increasing duration of the program content segments;
        (4) providing each program content segment from the first program source as the output delayed by the first program source delay time from the time it is received;
        (5) setting the second program source delay time to the first program source delay time minus the RTD;
        (6) providing a corresponding program content segment from the second program source as the output by the second program source delay time from the time said corresponding program content segment is received;
        (7) setting the first program source delay time equal to the second program source delay time; and
        (8) repeating steps (2)-(7) for subsequent program content segments; and
    d. providing the sequence of program segments as an output.

2. The method of claim 1 wherein the step of increasing the duration of the program content segments includes imperceptibly adding to the program content segment.

3. The method of claim 2 wherein imperceptibly adding to the program content segment includes imperceptibly adding frames to a video component of a program content segment.

4. The method of claim 2 wherein imperceptibly adding to the program content segment includes imperceptibly adding silent periods to an audio component of a program content segment.

5. The method of claim 1 comprising additionally the step of reducing the duration of the program segments and gradually reducing the first program source delay in response to an end of cycle signal.

6. The method of claim 5 wherein reducing the duration of the program content segments includes imperceptibly removing content from the program content segment.

7. The method of claim 6 wherein imperceptibly removing content from the program content segment includes imperceptibly removing frames from a video component of a program content segment.

8. The method of claim 6 wherein imperceptibly removing content from the program content segment includes imperceptibly removing silent periods from an audio component of a program content segment.

9. An apparatus for presenting alternating program content segments from a first source and from a second source, where the program content segments from the second source are each delayed from corresponding program content segments from the first source by a round-trip delay (RTD), comprising:
   a. a first delay buffer adapted to receiving and saving the program content segments from the first source;
   b. a second delay buffer adapted to receiving and saving the program content segments from the second source; and
   c. a controlled switcher coupled to the first and second delay buffers and adapted to combine in real time alternating program content segments from the first and second delay buffers to provide a sequence of program segments without any apparent delay and to provide the sequence of program segments as an output, wherein the steps controlled switcher combines the alternating program content segments in real time and provides the sequence of program segments as an output by:
   (1) setting a first program source delay time and a second program source delay time at zero;
   (2) increasing the duration of program content segments;
   (3) gradually increasing the first program source delay time by an amount corresponding to the increasing duration of the program content segments;
   (4) providing each program content segment from the first delay buffer as the output delayed by the first program source delay time from the time it is received;
   (5) setting the second program source delay time to the first program source delay time minus the RTD;
   (6) providing a corresponding program content segment from the second delay buffer as the output delayed by the second program source delay time from the time said corresponding program content segment is received;
   (7) setting the first program source delay time equal to the second program source delay time; and
   (8) repeating steps (2)-(7) for subsequent program content segments.

10. The apparatus of claim 9 wherein increasing the duration of the program content segments includes imperceptibly adding to the program content segment.

11. The apparatus of claim 9 wherein imperceptibly adding to the program content segment includes imperceptibly adding frames to a video component of a program content segment.

12. The apparatus of claim 9 wherein imperceptibly adding to the program content segment includes imperceptibly adding silent periods to an audio component of a program content segment.

13. The apparatus of claim 9 wherein the controlled switcher reduces the duration of the program segments and gradually reducing the first program source delay in response to an end of cycle signal.

14. The apparatus of claim 13 wherein reducing the duration of the program content segments includes imperceptibly removing content from the program content segment.

15. The apparatus of claim 14 wherein imperceptibly reducing the duration of the program content segment includes imperceptibly removing frames from a video component of a program content segment.

16. The apparatus of claim 14 wherein imperceptibly reducing the duration of the program content segment includes imperceptibly removing silent periods from an audio component of a program content segment.

* * * * *